United States Patent Office 3,070,219
Patented Dec. 25, 1962

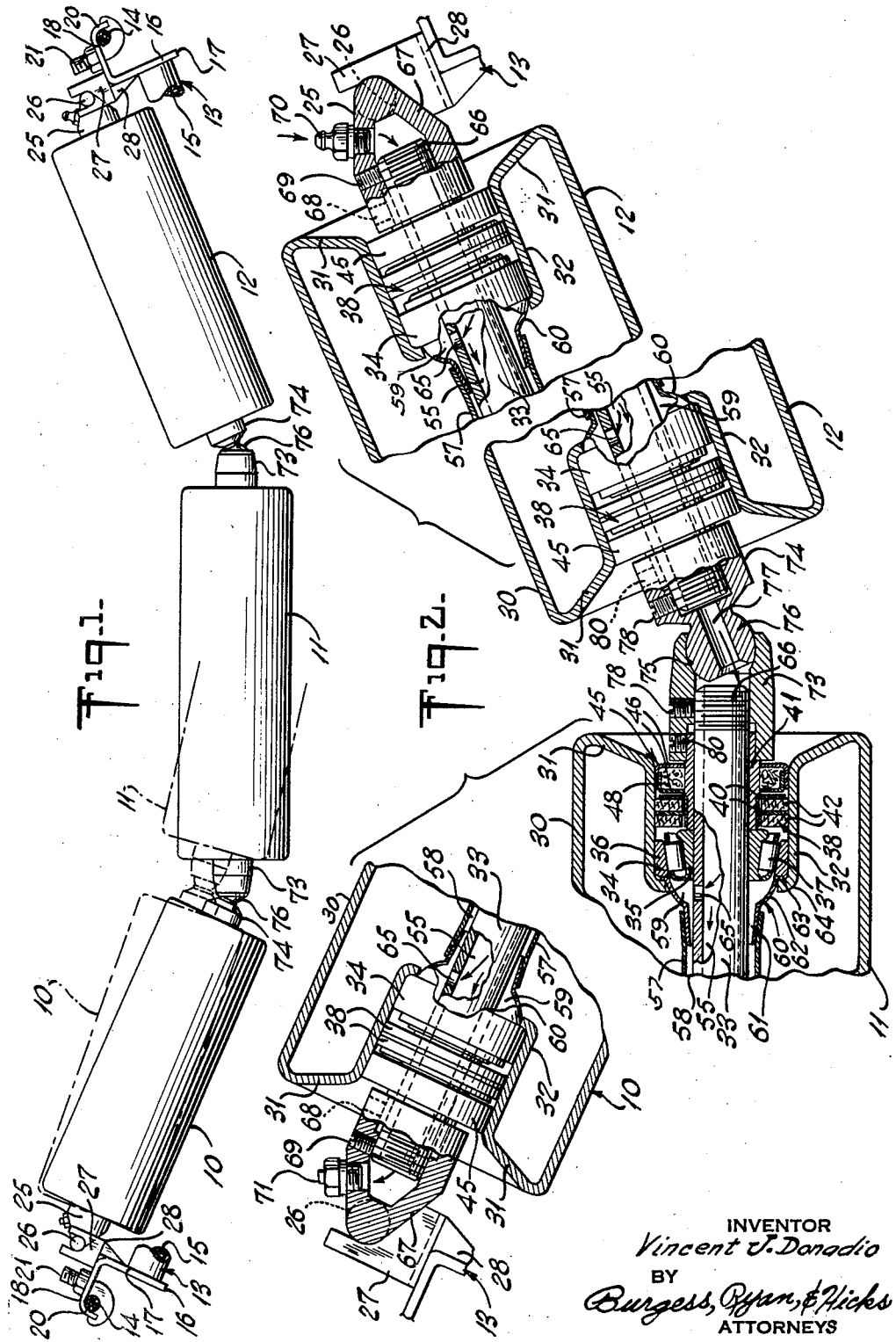

3,070,219
TROUGHING CONVEYOR BELT SUPPORT
Vincent J. Donadio, Mahwah, N.J., assignor to Hewitt-Robins Incorporated, New York, N.Y., a corporation of New York
Filed May 27, 1959, Ser. No. 816,124
12 Claims. (Cl. 198—192)

The present invention relates to a troughing conveyor belt support of the type wherein idler pulleys are connected together in angular axial relation to present conjointly a supporting surface imparting a transverse or troughlike curvature to the upper run of the travelling belt.

One object of the present invention is to provide a new and improved troughing conveyor belt support of the general character described, which is designed to permit the angular axial relation of its idler pulleys to be changed either selectively or automatically according to the transverse shape or position assumed by the belt and to permit the whole series of pulleys in the suport to be lubricated by a one-shot lubrication system, and which is comparatively less expensive to manufacture than conventional types of troughing conveyor belt supports.

In accordance with certain features of the present invention, the connections between adjoining idler pulleys of the belt support are flexible to permit the axial angularity of these pulleys to be easily changed and are hollow to permit lubricant grease to flow therethrough. For that purpose, these connections are desirably ball and socket joints of hollow construction and the pulleys have hollow axial dead shafts defining with the hollows of the joints a lubricant passageway extending along the full length of the series of pulleys from one end to the other. These shafts have ports leading to the different antifriction bearings supporting the pulleys on said shafts. At one end of this series of pulleys is an inlet grease fitting for the attachment of a one-shot lubricating grease gun and the opposite end desirably has a pressure relief fitting or valve.

As another feature of the present invention, the two male and female parts of the ball and socket joint have respective end sections in the form of collars which are screwed on to the confronting ends of the corresponding shafts of adjoining pulleys and which serve as means by which the distances between the confronting ends of these pulleys can be adjusted.

The troughing conveyor belt support of the present invention not only permits the use of a one-shot lubricating system, reduces substantially the cost of manufacturing this support and permits the angular axial relationship of the pulleys to be adjusted, but since the pulleys may be secured together to form a unit before mounting onto a frame, the mounting of the pulleys onto the frame is facilitated.

Various other objects, features and advantages are apparent from the following description and from the accompanying drawings in which:

FIG. 1 is an elevational view of a three idler pulley assembly forming a troughing conveyor belt support and embodying the present invention; and FIG. 2 is a longitudinal section through the assembly of FIG. 1 but shown on a larger scale.

Referring to the drawings, the troughing conveyor belt support of the present invention is shown comprising three idler pulleys 10, 11 and 12 connected end to end at an angle with each other in a manner to be described to form a belt support unit, and this unit is mounted on a rigid spreader frame 13 which in turn is secured at its ends to wire ropes or cable stringers 14 constituting the conveyor frame. The rigid spreader frame 13 for each belt support unit comprises a pair of rigid parallel trough-shaped tubes 15 rigidly interconnected at each end by a crossbar 16 in the form of an angle iron having its webs 17 extending in inclined directions along the sides of the belt support unit and its webs 18 extending lengthwise of the unit. The frame tubes 15 are rigidly connected to the webs 17 of the crossbars 16, as for example, by welding, and the webs 18 of said crossbars terminate in depending flanges 20 to engage the cable stringers 14. Clamp bolts 21 passing through the webs 18 of the crossbars 16 are hooked around the cable stringers 14 to connect the spreader frame 13 to said stringers.

Hanger brackets 25 on the outer ends of the two outside pulleys 10 and 12 of each belt support unit have rigid therewith respective pins 26 seated in the grooved side arms 27 of U-shaped saddles 28 rigidly connected to the crossbars 16 of the spreader frame 13, as for example, by welding. The pins 26 have rotative fits in the side saddle arms 27, thereby permitting the outer pulleys 10 and 12 to pivot in vertical planes about the spreader frame 13.

If desired, instead of employing a rigid spreader frame 13 as described, as far as certain aspects of the invention are concerned, the outside pulleys 10 and 12 may be hung directly onto the cable stringers 14 by rigid clamped attachment thereto of the hanger brackets 25. When the outside pulleys 10 and 12 are so directly attached to the cable stringers 14, these stringers are sufficiently free to twist, thereby providing adequate pivotal freedom of the outside pulleys 10 and 12 for pivotal movements in vertical planes.

The pulleys 10, 11 and 12 are identical and of hollow construction, and each comprises an outer cylindrical rim 30 and heads 31 at opposite ends of the rim, integrally connected thereto, as for example, by welding and each formed with an axial hub 32. A hollow dead shaft 33 fixed against rotation in relation to its corresponding pulley extends axially through the center of the pulley and located between each end of said shaft and the hub 32 at said end is an antifriction bearing 34. This bearing 34 comprises an inner race 35 connected to the shaft 33, an outer race 36 connected to the hub 32 and antifriction rollers 37 between said races. On the outer side of the bearing 34 in the hub 32 is a seal collar assembly 38 for preventing the escape of lubricant from the hub. This seal collar assembly 38 comprises two rigid flanged washers 40 embracing a rigid ring 41 secured to the shaft 33 and retaining two cork washers 42 in peripheral sealing engagement with the hub 32.

On the outer side of the lubricant seal assembly 38 is a dust seal 45 comprising two cups 46 in telescoping engagement to form a housing for a packing ring 48. This dust seal 45 embraces the ring 41 and extends radially outwardly to the hub 32.

The grease is injected into the outer end of the shaft 33 of the outside pulley 12 in a manner to be described and all of the shafts 33 are communicatively interconnected between pulleys in a manner to be described, so that a central passageway 55 is provided for this grease along the full length of the series of shafts from the outer end of the pulley 12 to the outer end of the pulley 10. Means are provided by which the grease in the passageway 55 can be diverted to the antifriction bearings 34. For that purpose, a sleeve 57 of light wall tubing of rigid material, such as steel, encircles the shaft 33 of each pulley with an annular clearance 58 and extends between the hubs 32 of the pulley. Extending between each end of the sleeve 57 and the adjoining hub 32, and encircling the shaft 33 with an annular clearance 59 in communication with the sleeve clearance 58, is a nipple 60 which may be made of steel stamping. This nipple 60 has a straight tapering end section 61 which can be forced into the end of the sleeve 57 during assembly to form a grease-tight joint with said sleeve and has a bell-mouthed section 62 terminating in a radial flange 63 retained between the outer race 36 of the bearing 34 and a radially inturned lip 64 on the hub 32.

Communication is established between the inside of the shaft 33 and each nipple clearance 59 through a port 65 in said shaft, the grease injected into the shaft finding its way thereby through said port into said clearance and into the rolling parts of the bearing 34. The sleeves 57, nipples 60 and ports 65 form conduit means by which the grease from the central passageway 55 is diverted to the bearings 34. The grease not only fills up the nipple clearances 59 but also the sleeve clearances 58.

Each shaft 33 has end sections 66 projecting axially outwardly beyond the dust seals 45 and beyond the ends of the corresponding pulley. Each of the outer pulleys 10 and 12 has its hanger bracket 25 secured to the projecting end section 66 at the outer end of its shaft 33. This hanger bracket 25 is in the form of a collar threaded onto the adjoining projecting end section 66 of the shaft 33 and has a hollow tapering head 67 to which the pivot pin 26 is rigidly connected. A pair of set screws 68 and 69 threaded in the bracket 25 and impinging on the ring 41 and the shaft 33 respectively, hold the bracket against rotation in relation to the shaft and at the same time hold the ring 41 against rotation and against movement along the shaft.

One of the hanger brackets 25, as for example, the one associated with the outer pulley 12, has an inlet fitting 70 screwed therein and of the type to receive a one-shot grease gun, such as that sold by Alemite and others. The hanger bracket 25 associated with the outer pulley 10 has a pressure relief spring-pressed valve fitting 71 of the well-known type having the function of permitting the escape of grease and of removing any danger of damage resulting from the continued application of grease at high pressure, after all the grease passageways and clearances in the assembled and joined pulleys have been filled. This fitting 71 is available with different spring pressures, so that it will open at any designed amount of pressure. In a specific embodiment, a relief fitting 71 which opens when the internal pressure exceeds 5 p.s.i. may be employed.

As an important feature of the present invention, the connections between the pulleys 10 and 11 and between the pulleys 11 and 12 are flexible hollow ones permitting passage of grease therethrough and permitting the relative axial angularity of the pulleys to be adjusted selectively and automatically according to the eccentricity of load conditions. Each of these flexible connections comprises a hollow ball and socket joint made up of a pair of collars 73 and 74, the collar 73 being threaded onto the projecting end section 66 of the shaft 33 for the middle pulley 11 and having a bearing socket 75 and the collar 74 being threaded onto the projecting end section 66 of the shaft 33 of the adjoining pulley 10 or 12 and terminating in a ball 76 retained in said socket with a bearing fit admitting of relative rotary motion of the collars in all directions within certain limits. This ball 76 has a center hole 77 to define with the bearing socket 75 a passage to permit flow of grease therethrough between joined collars 73 and 74.

The collars 73 and 74 are retained on their respective shafts 33 by set screws 78 threaded in respective collars and impinging on the projecting end sections 66 of the corresponding shafts 33 and these collars embrace the corresponding rings 41 and are affixed thereto by set screws 80 threaded in the respective collars and impinging on said rings. By this construction, the collars 73 and 74 serve not only as universal connections between the pulleys 10 and 11 and between the pulleys 11 and 12, but the manner in which they are constructed and applied permits these collars to be adjusted along their corresponding shafts 33, so that the distances between adjoining pulleys can be correspondingly adjusted. The hanger brackets 25 permit similar adjustments of the outer pulleys 10 and 12 in relation to the sides of the spreader frame 13. These adjustments of the collars 73 and 74 and the brackets 25 permit adjustments in the depth of troughing afforded by the pulleys 10, 11 and 12.

The hollow construction of the ball and socket joints 73, 74 afford free communication between the hollows of the shafts 33 and permit thereby grease to pass therethrough.

The resistance to turning of the elements of the ball and socket joints about their axes is greater than the torque required to rotate a pulley on its shaft 33, so that the shaft of the middle pulley 11 cannot rotate on its ball joint connections. The shafts 33 in the outer pulleys 10 and 12 are affixed to the supporting brackets 25 and cannot rotate.

In assembling, the pulleys 10, 11 and 12 are first flexibly secured together through the ball and socket connections and the pulleys so assembled can be handled and mounted as a unit onto the spreader frame 13. This facilitates assembly.

For lubricating, a one-shot grease gun, such as that made by Alemite, is applied to the fitting 70 to inject grease throughout the series of pulleys 10, 11 and 12. The pressure relief fitting 71 will assure the complete filling of the various passageways, clearances and bearing spaces of the pulleys.

In operation, the pulleys 10, 11 and 12 will assume a troughing position to support thereon the upper run of a travelling belt, and the positions of these pulleys will vary automatically according to the eccentric load conditions in said belt, as shown in dot and dash lines in FIG. 1. The ball and socket connections between the middle pulley 11 and the flanking pulleys 10 and 12, and the swivel connections between the brackets 25 and the sides of the spreader frame 13 permit these relative angular adjustments of the pulleys. This assures continuous contact of the troughed belt run with the upper troughed supporting surface of the pulley assembly.

While the invention has been described with particular reference to specific embodiment, it is to be understood that it is not to be limited thereto but is to be construed broadly and restricted solely by the scope of the appended claims.

What is claimed is:

1. A troughing conveyor belt support comprising a series of idler pulleys, an axial hollow shaft for each pulley, bearing means between said pulleys and said shafts for supporting said pulleys on said shafts, and flexible joints connecting said pulleys end to end at their longitudinal axes and permitting the angular axial relationship of the pulleys to be adjusted, each of said joints comprising a pair of tubular members pivotally connected together and conjointly defining a passage therethrough communicating with the hollows of the shafts on opposite sides of the joint, to define a lubricant passageway extending through and along the series of pulleys and through said flexible joints and communicating with said bearing means.

2. A troughing conveyor belt support as described in claim 1, wherein said flexible joints constitute ball and socket joints of hollow construction to permit lubricant to flow therethrough in the process of injecting lubricant into the series of pulleys.

3. A troughing conveyor belt support as described in claim 1, wherein a grease inlet fitting at one end of the passageway for a one-shot lubrication gun is provided.

4. A troughing conveyor belt support comprising a series of idler pulleys, a dead shaft for each of said pulleys, bearing means supporting said pulleys on said shafts respectively, and ball and socket joints between the confronting ends of and coaxial with adjoining shafts flexibly connecting said pulleys end to end in belt troughing angular relationship, said shafts and said joints conjointly defining a lubricant passageway extending through the full length of the series of pulleys and communicating with said bearing means, said passageway having an inlet connection at one end for injection of lubricant therethrough.

5. A troughing conveyor belt support comprising three idler pulleys forming a series, a hollow dead shaft for each of said pulleys, bearing means supporting said pulleys on said shafts respectively, collars threaded onto the outer ends respectively of the shaft of the middle pulley, collars threaded onto the ends respectively of the shafts of the outside pulleys adjoining said middle pulley, the two collars between each end of the shaft of the middle pulley and the adjoining end of the shaft of the adjoining outside pulley having interlocking ball and socket joint conformations forming a universal joint, said shafts being hollow and said collars being hollow to define with said shafts a lubricant passageway extending through the full length of the series of pulleys, and conduit means between said passageway and said bearing means for diverting lubricant from said passageway to said bearing means.

6. A troughing conveyor belt support as described in claim 5, wherein said conduit means encircle the shafts with annular clearances leading to the bearing means, and said conduit means include parts in said shafts establishing communication between the passageway in said shafts and said clearances.

7. A troughing conveyor belt support as described in claim 5, wherein each of said pulleys has a hub at opposite ends receiving the bearing means for the corresponding pulley, and said conduit means comprises a sleeve encircling each shaft with an annular clearance and extending between the two hubs of the corresponding pulley, and nipples between the ends of said sleeve and the latter hubs, each nipple having a tapering end section fitted into the adjoining end of the sleeve to form a grease-tight joint.

8. A troughing conveyor belt support as described in claim 4, wherein the series of pulleys consists of three pulleys, the outer ends of the shafts of the outside pulleys are closed by hanger brackets in the form of collars threaded onto the latter outer shaft ends respectively, and adapted to be secured to a conveyor frame, and a grease inlet fitting is provided in one of said brackets for receiving a one-shot grease gun.

9. A troughing conveyor belt support as described in claim 8, wherein a pressure relief valve fitting is provided in the other bracket.

10. In combination, a troughing conveyor belt support comprising at least three idler pulleys forming a series, flexible joints connecting said pulleys end to end and permitting said pulleys to be adjusted axially angularly in relation to each other, each of said joints between adjoining pulleys comprising a pair of tubular members rigidly connected to and extending axially from the latter pulleys respectively, said tubular members being pivotally joined together and conjointly defining a passage therethrough bearing means including said passages for said pulleys and means defining a lubricant passageway extending through and along the series of pulleys and through said flexible joints and communicating with said bearing means, and a frame structure for said support providing flexible connections for the outer ends of the two outside pulleys permitting the outer pulleys to pivot in vertical planes about the frame structure.

11. The combination as described in claim 10, wherein said frame structure comprises a rigid spreader frame extending along the full length of the series of pulleys, said flexible connections being provided between the outer ends of the two outside pulleys and the opposite ends of the frame structure.

12. In combination, a troughing conveyor belt support comprising at least three idler pulleys forming a series, a dead shaft for each of said pulleys, bearing means supporting said pulleys on said shafts respectively, and ball and socket joints between the confronting ends of and coaxial with adjoining shafts flexibly connecting said pulleys end to end in belt troughing angular relationship, said shafts and said joints conjointly defining a lubricant passageway extending through the full length of the series of pulleys and communicating with said bearing means, said passageway having an inlet connection for injection of lubricant therethrough, a frame structure for said support, and a flexible connection between the outer end of the shaft of each outside pulley and the adjoining section of said frame structure permitting the outer pulleys to pivot in vertical planes about said adjoining section of the frame structure.

References Cited in the file of this patent

UNITED STATES PATENTS

| | | |
|---|---|---|
| 1,295,138 | Dull | Feb. 25, 1919 |
| 1,472,049 | Clark | Oct. 30, 1923 |
| 1,838,190 | Robbins | Dec. 29, 1931 |
| 1,958,412 | Andrada et al. | May 15, 1934 |
| 2,250,512 | Vickers | July 29, 1941 |
| 2,592,831 | Spurgeon et al. | Apr. 15, 1952 |
| 2,862,608 | Newton | Dec. 2, 1958 |
| 2,875,886 | Lo Presti et al. | Mar. 3, 1959 |
| 2,987,164 | Gregg et al. | June 6, 1961 |

UNITED STATES PATENT OFFICE
CERTIFICATE OF CORRECTION

Patent No. 3,070,219　　　　　　　　　　December 25, 1962

Vincent J. Donadio

It is hereby certified that error appears in the above numbered patent requiring correction and that the said Letters Patent should read as corrected below.

Column 6, line 8, after "through" insert a comma; same line 8, strike out "including said passages"; line 9, after "means" insert -- including said passages --.

Signed and sealed this 20th day of August 1963.

(SEAL)
Attest:

ERNEST W. SWIDER
Attesting Officer

DAVID L. LADD
Commissioner of Patents